July 6, 1965

S. C. RASTOGI 3,193,189

SEAL MEANS FOR ROTARY MECHANISMS

Filed July 17, 1963

INVENTOR.
SHARAT C. RASTOGI
BY Raymond P. Wallace

AGENT

July 6, 1965  S. C. RASTOGI  3,193,189
SEAL MEANS FOR ROTARY MECHANISMS
Filed July 17, 1963  2 Sheets-Sheet 2
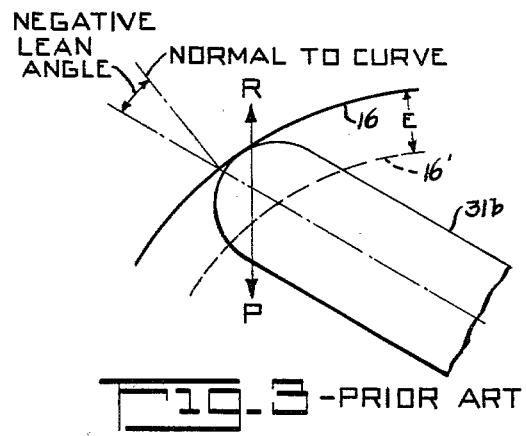
FIG. 3 - PRIOR ART
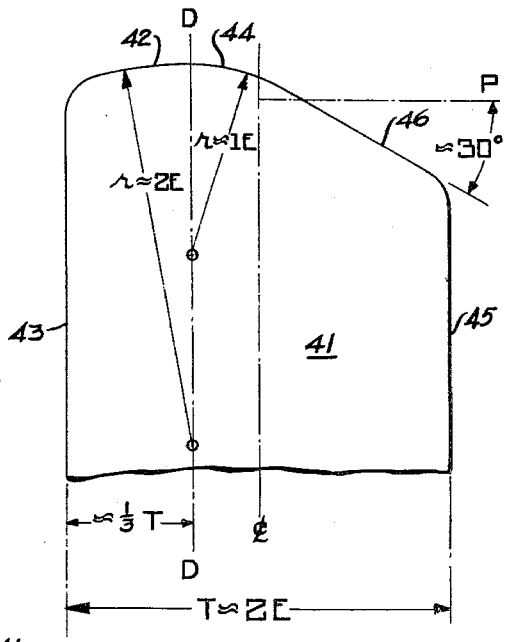
FIG. 4
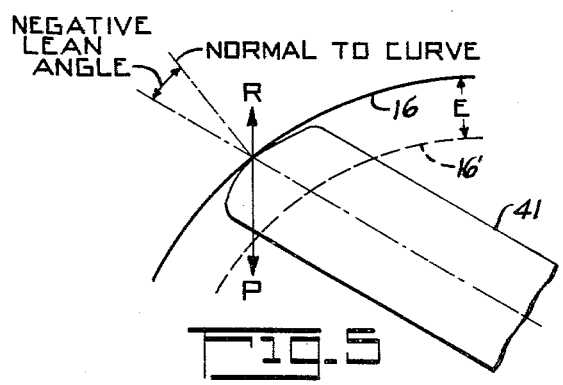
FIG. 5
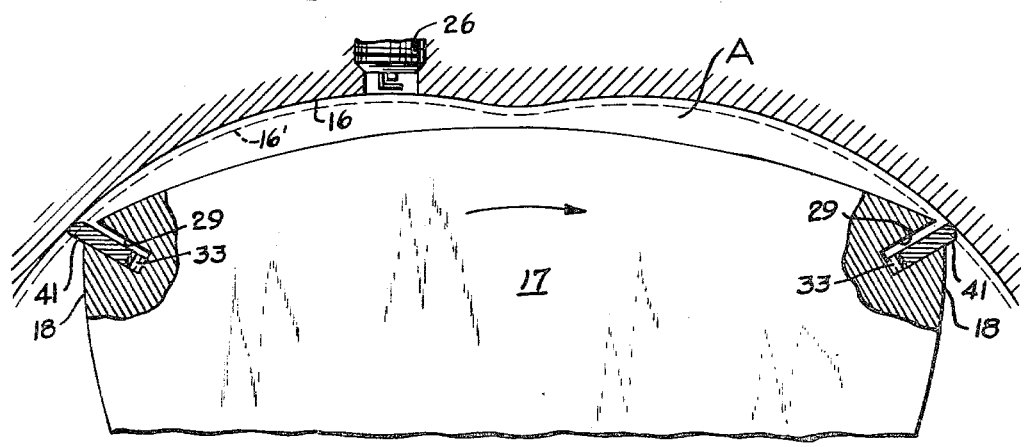
FIG. 6
INVENTOR.
SHARAT C. RASTOGI
BY Raymond P. Wallace
AGENT United States Patent Office 3,193,189
Patented July 6, 1965

3,193,189
SEAL MEANS FOR ROTARY MECHANISMS
Sharat C. Rastogi, Passaic, N.J., assignor to Curtiss-Wright Corporation, a corporation of Delaware
Filed July 17, 1963, Ser. No. 295,719
15 Claims. (Cl. 230—145)

This invention relates to rotary mechanisms of the Wankel type, and more particularly to an improved sealing arrangement for such mechanisms.

As known in the prior art, rotary mechanisms of the Wankel type have an outer body or housing having a longitudinal axis, and an inner body disposed within the housing on an axis parallel to, but displaced from, the housing axis, the two bodies being relatively rotatable. The outer body comprises a peripheral housing having an inner surface multicurved in cross-section transverse to the axis, preferably in a form that is basically epitrochoidal, and a pair of end plate closures, usually having parallel inner surfaces. The inner body has a plurality of apex portions, generally one more in number than the number of lobes of the basically epitrochoidal housing.

The inner body serves as a piston and is rotatably mounted on an eccentric portion of a shaft passing through one or both end walls. The device may be so arranged that either the inner body or the outer body rotates while the other is stationary, or it may be arranged for both inner and outer bodies to rotate. Upon relative rotation of the inner body and the outer body there are formed therebetween working chambers which vary in volume. When such a rotary mechanism is used as an internal combustion engine the chambers perform the four cycles of intake, compression, expansion, and exhaust. Such a rotary mechanism may also be used as a pump, compressor, or fluid motor.

Sealing elements are provided between the ends of the rotor and the inner surfaces of the end walls of the outer body. The apex portions of the rotor also bear sealing elements, which continuously sweep the epitrochoidal inner surface of the peripheral housing. Such apex seals are commonly strip members carried in slots or grooves disposed in the axial direction in the apexes of the rotor. The seal strips are resiliently urged in a radially outward direction into contact with the epitrochoidal surface, and as known in the prior art the edge of the strip which sweeps the surface in sealing relation has been rounded in the circumferential direction in a simple circular arc to provide smooth sliding contact with the inner surface of the peripheral housing.

However, the sealing conditions of such rotary mechanisms are complex, and the various factors influencing seal performance are numerous and intricate. The apex seals are subjected to varying chamber pressures and centrifugal forces, and they sweep the surface at constantly varying angles and peripheral speeds. One defect produced by using the simple apex seals of the prior art under these complex operating conditions has been the formation of so-called "chatter marks" on the epitrochoidal inner surface of the peripheral housing, with consequent imperfect sealing and reduction of the efficiency of the device. Such chatter marks are minute furrows in the surface parallel with the longitudinal extent of the seal strips, and hence causing bouncing of the resiliently mounted seals as the strips sweep across the ridges, with some loss of sealing efficiency.

The present invention provides apex seal strips having their sealing edges contoured in such a manner as to counteract the conditions causing the seals of the prior art to form chatter marks.

It is therefore a primary object of this invention to provide apex seals of such form as to improve the peripheral sealing of rotary mechanisms.

It is a further object to provide apex seals of such form as to obviate or retard the formation of chatter marks.

Another object of the invention is to provide apex seals having their edges arcuately contoured in a non-circular manner.

A still further object is to provide apex seal means of such form as to cooperate in sealing relation with an epitrochoidal surface.

The foregoing objects and others ancillary thereto will be more clearly understood on reading the following specification in connection with the accompanying drawings, in which—

FIGURE 2 is a semi-schematic enlarged view of a portion of such a rotary mechanism, showing the apex seals of the prior art;

FIGURE 3 is an enlarged diagrammatic representation of a typical apex seal of the prior art;

FIGURE 4 is a much enlarged fragmentary diagrammatic view of the sweeping edge of the seal strip of the present invention;

FIGURE 5 is a diagrammatic view similar to FIGURE 3, showing the seal of the present invention; and FIGURE 6 is a view similar to FIGURE 2, showing the improved apex seals in operational environment.

Figure 1:
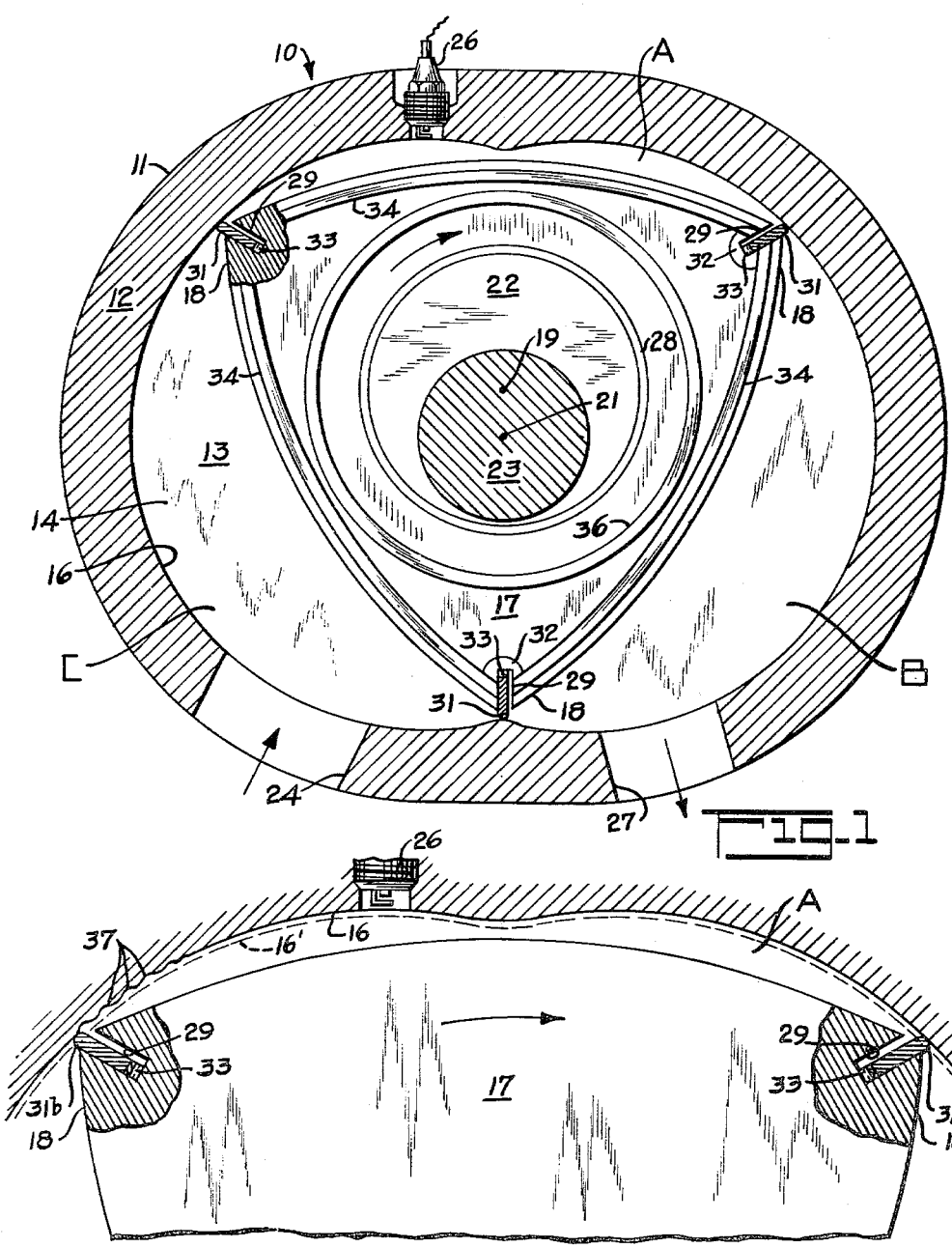
FIGURE 1 is an elevational view of a rotary mechanism along the longitudinal axis, with one end wall removed.

Although rotary mechanisms of this type may be used as internal combustion engines, pumps, compressors, or fluid motors, and although the present invention is equally applicable in any of such uses, for purposes of simplification the following description will be in terms of an internal combustion engine. Also, and again for simplification, although in rotary mechanisms of the Wankel type either the inner body or the outer body, or both, may be rotatable, the following description will be in terms of a mechanism in which relative rotation between the inner body and outer body is achieved by maintaining the outer body fixed and rotating the inner body or rotor therein.

Referring more particularly to FIGURE 1, reference character 10 designates a rotary internal combustion engine. Said engine 10 comprises an outer body 11 having a peripheral wall 12 closed at each end by two axially-spaced end walls 13, of which only the rearmost is shown, the other being removed to expose the interior of the machine. There is thus formed within the outer body a cavity 14 having a multilobed profile defined by the peripheral wall. The inner surface 16 of the peripheral housing defining such a multilobed cavity is basically epitrochoidal in outline, but its actual curve will frequently be slightly outside of and parallel to the true epitrochoid, for reasons which will hereinafter be explained. In the specific embodiment illustrated, the invention is shown in a two-lobed epitrochoid, but devices of this type may have epitrochoidal housings having any desired number of lobes.

An inner rotor 17 is disposed within the cavity 14 of outer body 11. The inner rotor has axially-spaced, parallel end faces disposed adjacent to the outer body end walls in sealing relation therewith. The rotor has also a plurality of circumferentially-spaced apex portions 18, preferably one more in number than the lobes of the cavity. As illustrated, the rotor 17 has three apex portions 18 and the periphery of the rotor has a generally triangular profile with convexly arcuate sides which comprise the working faces of the rotor. As hereinafter more fully explained, the apex portions 18 are in sealing engagement with the inner surface 16 of the peripheral wall 12 to form a plurality (three as illustrated) of working chambers A, B, and C between the inner body 17 and the outer body 11. The rotational axis 19 of the rotor is offset from and is disposed parallel to the axis 21 of the outer body. In the particular embodiment shown, axis 19 planetates around axis 21.

In the engine 10 as illustrated, the outer body 11 is stationary while the rotor 17 is rotatably journaled on an eccentric portion 22 of a shaft 23, the axis of the shaft being coaxial with that of the cavity 14 of the outer body. Upon rotation of the rotor 17 relative to the outer body 11 the working chambers A, B, and C vary in volume. At least one intake port 24 is provided in the outer body for admitting air and fuel into the working chambers; the intake port is shown as being through the peripheral wall 12, but it is to be understood that intake ports may also be provided in either or both end walls 13. A spark plug 26 is provided for igniting the combustion mixture, and at least one exhaust port 27 is provided in the outer body for discharge of the exhaust gases from the working chambers. As shown, the exhaust port is positioned in the peripheral wall, but either or both end walls may be provided with exhaust ports.

During engine operation each of the working chambers goes through a cycle of operation including the four phases of intake, compression, expansion, and exhaust, these phases being similar to the strokes in a reciprocating internal combustion engine having a four-stroke cycle. In FIGURE 1 the rotor is shown with chamber A at top dead-center, the chamber being at full compression with combustion just beginning, the rotor turning in the direction shown by the arrow. Chamber B is exhausting through port 27, and chamber C is intaking through port 24. The pressure of the expanding gases is transferred through the rotor to the eccentric 22, which is in effect a crankpin; appropriate bearing means 28 is provided between the rotor and the eccentric.

For efficient operation, the working chambers A, B, and C should be sealed, both at the apexes of the rotor and also against escape or transfer of gases at the end faces of the rotor. Each rotor apex portion 18 has a groove or slot 29 extending inwardly, preferably radially, from the apex, and running from one end face of the rotor to the other in a direction parallel to the axis. Each apex carries identical structure for effecting sealing with the inner surface 16 of the peripheral wall 12 and with the inside surfaces of the end walls 13 of the outer body. Such structure includes a seal strip 31 disposed in the groove, and intermediate seal members 32 located at each end of the groove.

The seal strips are urged by a spring 33 (shown in FIGURES 2 and 6) into sealing engagement with inner surface 16. As shown, a spring 33 is located under each seal strip and bears against both the seal strip and the bottom of the groove. The seal strip has a sliding fit in the groove, with only necessary clearance (exaggerated in the drawings for clarity of illustration). During operation of the engine, under the varying conditions of pressure, friction, and centrifugal forces, the seal strip is urged laterally into sealing engagement with one side or the other of the groove 29, the total clearance being then left at the other side of the seal strip.

The intermediate seal members 32 are generally cylindrical bodies of relatively short axial length, received in cylindrical bores in the rotor apex portions at each end of grooves 29, each seal member 32 having a groove in line with groove 29 and being in effect an extension thereof, receiving the end of a seal strip 31.

Each end face of the rotor 17 is provided with grooves near the periphery thereof and generally parallel thereto and running between apexes, each of which grooves receives an end face sealing member 34. The end face seals 34 are so disposed that their trailing ends butt against the periphery of intermediate members 32 substantially normal thereto, whereas the leading ends of end face seals 34 overlap the periphery of members 32 at the radially outward side thereof, members 32 being slightly shouldered at that point to receive the overlap. The end face seals 34, in sealing cooperation with intermediate members 32 and the ends of seal strips 31, provide sealing against the end walls 13 to prevent the escape or transfer of gas from the chambers A, B, and C. Suitable spring means may be provided in the grooves under the end seals 34 to urge them in an axial direction against the end walls 13.

In addition, an oil seal ring 36 is disposed in a circular groove in each end face of the rotor radially outward of the journal bearing 28 and radially inward of the end face seals 34. Seal rings 36 function to prevent leakage of lubricating oil radially outwardly beyond said rings 36 between their associated rotor end faces and the outer body end walls. Suitable spring means may be provided under the oil rings to urge them in an axial direction.

In a rotary mechanism of the type described, it would theoretically be possible to make the inner surface 16 of peripheral wall 12 a true epitrochoid, and so dimension the rotor 17 that the apexes would ride exactly in contact with the inner surface. Hence, no apex sealing members would be necessary, sealing being performed by the tips of the rotor apexes. However, such dimensioning is impractical for manufacturing reasons. There must necessarily be certain tolerances on the dimensions of the peripheral housing, the rotor dimensions, the diameter of the eccentric, the bore through the rotor, bearing positioned therein, and the operating clearances between the various parts. In addition, there are minor deflections of the shaft under pressure conditions, and slight elastic deformation of the metals of the various elements, even though of very small magnitude.

For such reasons of manufacturing practicality, it has been found desirable to provide the resiliently mounted apex seal strips described above. If these seal strips were longitudinally chamfered to a knife-edge sweeping the inner surface of the peripheral housing, it would provide line-contact sealing. However, such a thin edge would soon wear down and is therefore impractical. Therefore, the apex seal strips of the prior art have been rounded in a convex circular arc in the circumferential direction along the sealing edge.

With seal strips having such an arcuate sealing edge, the line of sealing contact does not remain in the center of the arc during operation, but moves back and forth along the arcuate edge as the angle of the seal to the peripheral surfaces changes. If the curvature of the peripheral housing were made as nearly as possible to the true epitrochoid, the seal strip would then move in and out in its slot against the resilient means urging it outwardly, since the line of contact itself would not be tracing a precise epitrochoid. It is desirable that such radial movement of the seal strips be kept to a minimum, and for this reason it is known in the prior art to construct the peripheral housing with the inner surface on a curve outside the true epitrochoid, but parallel thereto, the amount of the offset, called the equidistance, being equal to the radius of curvature of the edge of the apex seal strips. This relationship is shown in FIGURE 2, wherein the true epitrochoid is indicated by the dashed line 16'.

Although the foregoing expedient is satisfactory as far as minimizing radial seal movement, other undesirable effects can arise. As shown in FIGURE 2, combustion is beginning in chamber A. As combustion is initiated there is a sudden rise in pressure in the chamber, and as a result of the combination of the various clearances, slight shaft deflection, and similar factors, the rotor is thrust sharply in a direction away from the peripheral wall, that is, downward as shown in FIGURE 2. At the same time, the apex seal strips are thrust by gas pressure against the walls of their slots in a direction outwardly from the center of pressure. Thus the leading seal 31a is pushed against the leading wall of its slot, and the trailing seal 31b is held against the trailing wall of its slot, as shown. The natural resiliency of the materials, resulting from their various coefficients of elasticity, then causes an immediate rebound of the rotor toward its normal center. The seals, however, remain pressed against their respectively outward groove walls. The sweeping edge of trailing seal strip 31b, which in the first part of the maneuver had been briefly thrust out of contact with peripheral surface 16, now on rebound strikes the surface with a sharp impact.

Although the seals are spaced evenly around the triple-apexed rotor of this embodiment and are therefore 120° apart, owing to the relative rotation of the rotor and the outer body the radial centerline of the seal strips is not always normal to the curvature of the peripheral wall. Rather, the seals sweep around the epitrochoidal surface at a constantly varying angle, called the lean-angle. Four times during each complete revolution each seal will pass through a position of zero lean-angle, that is, its centerline will be normal to the curvature of surface 16. These positions occur when the seal centerline is coincident with either the major or minor axis of the epitrochoidal profile. At all other positions the seals have either a positive or a negative lean-angle of varying amount.

At the firing position shown in FIGURE 2, leading seal 31a has a positive lean-angle; if a normal to the curve be taken at the intersection of the radial centerline of the seal with the curve, the radially inner edge of the seal strip will be behind the normal. Likewise with trailing seal 31b, the radially inner edge of the seal is forward of a normal to the curve taken at the intersection of the seal centerline, and seal 31b is said to have a negative lean-angle. This relationship is shown in enlarged detail in FIGURE 3.

With a seal strip of the prior art wherein the sweeping edge has a simple circular arcuate form, such as 31b shown in FIGURES 2 and 3, when the seal is at a negative lean-angle as at firing position, the line of sealing contact between the peripheral surface and the sweeping edge of the seal is forward of the radial centerline of the seal. The forces of the pressure impact and the resulting rebound are not exerted in a direction along the radial centerline of the seal, but in a direction parallel to a line drawn through the center of the firing chamber and the axis of the rotor. Thus at the trailing seal 31b the forces of pressure and rebound are exerted along a plane indicated by line P—R of FIGURE 3. Therefore, on rebound the trailing side of the seal strip slot of seal 31b constitutes an inclined plane to which the rebound force must be transmitted and along which the seal strip must slide before the resilient member under the seal can respond. Since the application of rebound impact is extremely rapid, and lubrication of the peripheral surface in the combustion region is minimal, sliding along the inclined plane does not take place quickly enough, and there is some tendency for the edge of the seal strip to gouge the peripheral surface at the point of impact. There is thus formed a slight channel or furrow in peripheral surface 16 parallel with the seal strip.

The effect does not necessarily occur at precisely the same spot for each of the apex seals, and since the rotor is turning at a high rate of speed even the most minute variations of timing in firing the combustible mixture may cause variation in the angular location at which the effect occurs for any given seal. Such variation in firing time can arise from minor imperfections in camming or other means of initiating the spark, from minute changes in resistance in the firing circuit, from the composition or compression of the combustible mixture, and other causes. There may also be a tendency for the deflection and rebound of the rotor to be repetitive within a single firing. Although such deflection and rebound are extremely minute in proportion to the dimensions of the machine, they do have a cumulative effect, and thus there are formed the so-called chatter marks 37, minute furrows (shown in FIGURE 2 and much exaggerated in the drawing) in the peripheral surface 16, occurring in the region occupied by the trailing seal strip of the firing chamber at the time of firing, and damping out in the direction of rotor rotation.

In order to prevent the formation of these chatter marks, the present invention provides apex seal members having their sweeping sealing edges contoured and positioned in such a manner that the trailing seal of the firing chamber, at the moment of firing, does not present a sharply curved portion of arc to the peripheral surface 16, and the line of sealing contact is approximately at the radial centerline of the seal, rather than forward thereof.

In FIGURE 3 there is shown diagrammatically a seal 31b of the prior art, positioned as at the moment of firing. It has been common to make seal strips of a thickness approximately equal to twice the equidistance, with an edge radius of curvature equal to the equidistance. With such proportioning, at the moment of firing the line of sealing contact, owing to the negative lean-angle of the seal, is forward of its radial centerline, and line P—R passes through the line of contact. Although the seal shown has its sweeping edge curved in a full semicircular arc, it has also known to contour the sweeping edge with an arc of the same radius but less circumferential extent, extending in each direction from the radial centerline only as far as the locations of the sealing line at the largest positive or negative lean-angles, and then chamfering radially inwardly at any suitable angle. Such a design, however, does not cure the problem of chatter marks, but rather aggravates it, with the liability of presenting a sharp edge on rebound at or near the sealing line.

FIGURE 4 shows a much enlarged fragmentary end view of the sweeping edge of the design of a seal strip 41 according to the present invention. For a rotary mechanism of the type described having a given equidistance E, the seal strip is made to a thickness T equal to approximately 2E. The trailing portion 42 of the sweeping edge is contoured to a radius of 2E plus or minus 25%, and preferably approximately 2E. The center of curvature of portion 42 is on a plane D—D parallel with the trailing side 43 of the seal strip and distant therefrom in the direction of rotation, or forward, from 25% to 40% of T, and preferably approximately ⅓T. The curve of portion 42 is carried forward only to the point where it is normal to plane D—D. The curve of the sweeping edge is then further carried forward by a central portion 44, tangent to portion 42, on a radius of 1E plus or minus 20%, and preferably approximately 1E, such radius also having its center on plane D—D. Portion 44 is carried forward at least as far as the radial centerline of the seal and preferably somewhat further, such as about 10% of T. The sweeping edge is then completed by a flat leading portion 46 tangent with portion 44 and chamfered off in the radially inward direction to leading side 45, at an angle to a perpendicular to the centerline (or central radial plane) greater than the maximum lean-angle to be encountered. In practice it has been found convenient to make the angle of chamfer approximately 30°. The leading and trailing corners of the sweeping edge may be left sharp, or rounded off to any convenient small radius, such as about 10% of T, as shown.

In FIGURE 5 there is shown the improved seal strip 41 in a view similar to that of FIGURE 3. It will be seen that with seals of the present invention the line of sealing contact is approximately coincident with the median plane of the seal strip, with line P—R passing through the line of contact, and the leading portion of the sweeping edge chamfered off to a non-interfering angle. Hence, on rebound of the rotor as previously described the seal strip 41 does not present a sharp radius or edge to the peripheral surface 16, and the rebound impact is transmitted along the radial centerline of the seal to allow immediate resilient response. FIGURE 6 shows the improved seal 41 in operational environment, in a view similar to that of FIGURE 2.

Although the invention has been described above in a preferred embodiment, it will be understood that various changes and modifications may be made by those skilled in the art without departing from the scope of the invention. It is intended to cover all such modifications in the appended claims.

What is claimed is:

1. In a rotary mechanism comprising an outer body having a peripheral wall forming a cavity having a longitudinal axis and end walls spaced apart along said axis and interconnected by said peripheral wall, an inner body disposed within said cavity and rotatable relative to said outer body about an axis displaced from but parallel to said outer body axis and planetating therearound, said inner body having axially-spaced end faces in sealing relation to said end walls, said inner body having a plurality of circumferentially-spaced apex portions for engagement with the inner surface of said peripheral wall, the radial dimension of said inner body being greater at each apex portion than between said apex portions whereby on such relative rotation working chambers of variable volume are formed between said inner and outer bodies, said inner body having at each of said apex portions a groove running between said end faces and extending inwardly substantially radially to said inner body; the combination with said rotary mechanism of a seal strip member having length, width, and thickness disposed in each of said grooves with its width disposed in the generally radial direction and its thickness disposed in the circumferential direction and having a sweeping edge protruding from said groove in sealing contact with the inner surface of said peripheral wall, each of said sweeping edges having a leading portion, a central portion, and a trailing portion, said trailing portion being convexly curved and having a radius of curvature between 75% and 125% of said thickness, said central portion being convexly curved tangent to said trailing portion and having a radius of curvature between 40% and 60% of said thickness, and said leading portion being tangent to said central portion and chamfered toward the radially inward direction.

2. The combination recited in claim 1, wherein the centers of curvature of said trailing portion and said central portion are located on a plane within said seal strip, said plane being parallel to the trailing side of said strip and disposed forwardly thereof at a distance between 25% and 40% of the thickness of said strip.

3. The combination recited in claim 1, wherein said leading portion is chamfered at an angle of approximately 30° to a perpendicular to the central radial plane of said strip.

4. The combination recited in claim 1, wherein each of said seal strips is resiliently urged radially outwardly of said inner body.

5. The combination recited in claim 1, wherein during at least a portion of relative rotation between said inner body and said outer body sealing contact between said sweeping edge and said inner surface is along a line substantially coincident with the outermost extension of the central radial plane of said seal strip.

6. A peripheral seal for a rotary mechanism, comprising a strip member having a longitudinal plane leading side, a plane trailing side substantially parallel to said leading side and displaced therefrom by a distance T, a longitudinal inner edge substantially perpendicular to said sides, and a longitudinal sweeping edge opposite said inner edge, said sweeping edge having a trailing portion, a central portion, and a leading portion, said trailing portion being adjacent to said trailing side and convexly curved on a radius between 75% and 125% of T, said central portion being convexly curved and tangent to said trailing portion and having a radius of curvature between 40% and 60% of T, and said leading portion being tangent to said central portion and chamfered toward said inner edge.

7. The combination recited in claim 6, wherein the radius of curvature of said trailing portion is approximately equal to T, and the radius of curvature of said central portion is approximately equal to ½T.

8. The combination recited in claim 6, wherein the centers of curvature of said trailing portion and said central portion are located on a plane within said seal strip, said plane being parallel to the trailing side of said strip and disposed a distance therefrom between 25% and 40% of T.

9. The combination recited in claim 8, wherein the distance between said trailing side and said plane is approximately equal to ⅓T.

10. In a rotary mechanism comprising an outer body having a peripheral wall forming a cavity having a longitudinal axis and end walls spaced apart along said axis and interconnected by said peripheral wall, said peripheral wall having an inner surface of basically epitrochoidal multilobed outline in profile transverse to said axis, an inner body disposed within said cavity and rotatable relative to said outer body about an axis displaced from but parallel to said outer body axis and planetating therearound, said inner body having axially-spaced end faces in sealing relation to said end walls, said inner body having a plurality of circumferentially-spaced apex portions for engagement with said inner surface, the radial dimension of said inner body being greater at each apex portion than between said apex portions whereby on such relative rotation working chambers of variable volume are formed between said inner and outer bodies, said apex portions being one more in number than the number of lobes of said cavity, said inner body having at each of said apex portions a groove running between said end faces and extending inwardly substantially radially to said inner body; the combination with said rotary mechanism of a seal strip member having length, width, and thickness disposed in each of said grooves with its width disposed in the generally radial direction and its thickness disposed in the circumferential direction and having a sweeping edge protruding from said groove in sealing contact with said inner surface, each of said sweeping edges having a leading portion, a central portion, and a trailing portion, said trailing portion being convexly curved on a radius approximately equal to said thickness, said central portion being convexly curved tangent to said trailing portion and having a radius of curvature approximately equal to one-half of said thickness, and said leading portion being flat and tangent to said central portion and chamfered toward the radially inward direction.

11. The combination recited in claim 10, wherein said inner surface has a curve parallel to a true epitrochoid, said curve being spaced outside said true epitrochoid by a distance E equal to approximately one-half the thickness of said seal strip.

12. The combination recited in claim 11, wherein said trailing portion has a radius of curvature equal to approximately 2E and said central portion has a radius of curvature approximately equal to E.

13. The combination recited in claim 12, wherein the centers of curvature of said trailing portion and said central portion are located on a plane within said seal strip, said plane being parallel to the trailing side of said strip and disposed forwardly thereof at a distance approximately ⅓ of the thickness of said strip.

14. The combination recited in claim 13, wherein during at least a portion of relative rotation between said inner body and said outer body sealing contact between said sweeping edge and said inner surface is along a line substantially coincident with the outermost extension of the central radial plane of said seal strip.

15. A peripheral seal for a rotary mechanism, comprising a strip member having a longitudinal plane leading side, a plane trailing side substantially parallel to said leading side and displaced therefrom by a distance T, a longitudinal inner edge extending between said sides substantially perpendicular thereto, and a longitudinal sweeping edge opposite said inner edge, said sweeping edge having a trailing portion, a central portion, and a leading portion, said trailing portion being convexly curved and having a radius of curvature approximately equal to T, said central portion being convexly curved and tangent to said trailing portion and having a radius of curvature approximately equal to ½T, the centers of curvature of said trailing and central portions being located on a plane within said seal strip parallel to said trailing side and displaced therefrom a distance approximately equal to ⅓T, said trailing portion extending between said trailing side and said plane, said central portion extending from said plane toward said leading side at least to the central radial plane of said strip, and said leading portion being tangent to said central portion and extending between said central portion and said leading side and being chamfered toward said inner edge.

References Cited by the Examiner
UNITED STATES PATENTS

| | | | |
|---|---|---|---|
| 333,356 | 12/85 | Taber | 103—138 |
| 1,434,716 | 11/22 | Marion | 103—137 |
| 2,302,411 | 11/42 | Behrens | 103—137 |
| 2,352,941 | 7/44 | Curtis | 103—138 |
| 2,353,965 | 7/44 | Meador | 103—138 |
| 3,102,492 | 9/63 | Bentele et al. | 103—130 |

JOSEPH H. BRANSON, Jr., *Primary Examiner.*

WILBUR J. GOODLIN, *Examiner.*